US008207972B2

(12) United States Patent
Wei et al.

(10) Patent No.: US 8,207,972 B2
(45) Date of Patent: Jun. 26, 2012

(54) QUICK PIXEL RENDERING PROCESSING

(75) Inventors: Jian Wei, San Diego, CA (US); Chehui Wu, San Diego, CA (US); James M Brown, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 801 days.

(21) Appl. No.: 11/615,379

(22) Filed: Dec. 22, 2006

(65) Prior Publication Data

US 2008/0150949 A1 Jun. 26, 2008

(51) Int. Cl.
*G06F 15/00* (2006.01)
*G06F 1/00* (2006.01)
*G06F 15/80* (2006.01)
*G06T 1/20* (2006.01)
*G06F 9/46* (2006.01)

(52) U.S. Cl. ........ 345/501; 345/505; 718/105; 718/106; 718/107

(58) Field of Classification Search .................. 345/505, 345/506, 581, 501; 718/103, 104, 105, 106, 718/107
See application file for complete search history.

(56) References Cited

U.S. PATENT DOCUMENTS

| 4,636,942 | A | * | 1/1987 | Chen et al. ............... 710/269 |
|---|---|---|---|---|
| 5,847,717 | A | | 12/1998 | Berry |
| 6,016,542 | A | * | 1/2000 | Gottlieb et al. ............ 712/225 |
| 6,108,460 | A | * | 8/2000 | Rich ........................... 382/304 |
| 6,501,471 | B1 | * | 12/2002 | Venkataraman et al. ..... 345/424 |
| 6,518,965 | B2 | * | 2/2003 | Dye et al. .................... 345/419 |
| 6,919,908 | B2 | * | 7/2005 | Munshi et al. ............. 345/620 |
| 6,950,107 | B1 | * | 9/2005 | Moreton et al. ............. 345/543 |
| 7,075,541 | B2 | * | 7/2006 | Diard ............................ 345/505 |
| 7,139,003 | B1 | * | 11/2006 | Kirk et al. ..................... 345/531 |
| 7,174,436 | B1 | * | 2/2007 | Langendorf et al. .......... 711/156 |
| 7,200,721 | B1 | * | 4/2007 | Lang et al. .................... 711/141 |
| 7,233,335 | B2 | * | 6/2007 | Moreton et al. ............. 345/522 |
| 7,234,144 | B2 | * | 6/2007 | Wilt et al. ..................... 718/104 |
| 7,460,126 | B2 | * | 12/2008 | Grantham et al. ............ 345/505 |
| 7,633,506 | B1 | * | 12/2009 | Leather et al. ................ 345/506 |
| 2002/0145612 | A1 | * | 10/2002 | Blythe et al. ................. 345/581 |

(Continued)

FOREIGN PATENT DOCUMENTS

JP 2003515853 A 5/2003

(Continued)

OTHER PUBLICATIONS

International Search Report—PCT/US07/088386, International Search Authority—European Patent Office—Jun. 4, 2008.
Written Opinion- PCT/US07/088386, International Search Authority—European Patent Office—Jun. 4, 2008.

(Continued)

*Primary Examiner* — Aaron M Richer
*Assistant Examiner* — Robert Craddock
(74) *Attorney, Agent, or Firm* — George Christ Pappas; James R. Gambale, Jr.

(57) ABSTRACT

A three-dimensional (3D) graphics pipeline which processes pixels of sub-screens in the last stage (pixel rendering) in parallel and independently. The sub-screen tasks are stored in a list in a shared memory. The shared memory is accessed by a plurality of processing threads designated for pixel rendering. The processing threads seize and lock sub-screens tasks in an orderly manner and process the tasks to create the bit map for display on a screen. The tasks are created by dividing a display area having the vertex information superimposed thereon into M×N sub-screen tasks. Based on system profiling, M and N may be varied.

48 Claims, 13 Drawing Sheets

U.S. PATENT DOCUMENTS

| | | | |
|---|---|---|---|
| 2003/0071816 A1* | 4/2003 | Langendorf | 345/519 |
| 2004/0075661 A1 | 4/2004 | Yamaguchi et al. | |
| 2004/0207630 A1* | 10/2004 | Moreton et al. | 345/543 |
| 2005/0041031 A1* | 2/2005 | Diard | 345/505 |
| 2005/0068325 A1* | 3/2005 | Lefebvre et al. | 345/522 |
| 2005/0128203 A1* | 6/2005 | Huang et al. | 345/506 |
| 2008/0313434 A1* | 12/2008 | Naoi | 712/216 |

FOREIGN PATENT DOCUMENTS

| | | |
|---|---|---|
| JP | 2003346138 A | 12/2003 |
| JP | 2006318404 A | 11/2006 |
| WO | WO0141073 A1 | 6/2001 |

OTHER PUBLICATIONS

Palmer, et al, "Ray Casting on Shared-Memory Architectures Memory-Hierarchy Considerations in Volume Rendering," IEEE Concurrency, IEEE Service Center, Piscataway, NY, US, vol. 6, No. 1, Jan. 1, 1998, pp. 20-35, XP000737883.

"Design for Parallel Interactive Ray Tracing Systems", James Bigler, Sep. 20, 2006, pp. 1-10, XP31008787, annexed.

Software-Base Geometry Operations for 3D Computer Graphics, Mihai Sima, Feb. 10, 2006, pp. 187-196, XP001152081, annexed.

International Preliminary Report on Patentability—PCT/US07/088386, International Search Authority—European Patent Office—Berlin—Mar. 20, 2009.

* cited by examiner

QUICK PIXEL RENDERING PROCESSING

BACKGROUND

I. Field

The present disclosure relates generally to image processing, and more specifically to techniques for a three-dimensional (3D) graphics pipeline for providing quick pixel rendering processing without a dedicated hardware graphics accelerator.

II. Background

Converting information about 3D objects into a bit map that can be displayed is known as pixel rendering, and requires considerable memory and processing power. In the past, 3D graphics were available only on powerful workstations, but now 3D graphics accelerators are commonly found in personal computers (PC). The hardware graphics accelerator contains memory (e.g. instruction random access memory (IRAM)) and a specialized microprocessor to handle many of the 3D rendering operations. OPEN GL®. (Open Graphics Library) for desktops defines an application programming interface (API) for writing applications that produce 3D and 2D computer graphics. The API includes hundreds of functions for drawing complex three-dimensional scenes from primitives.

OPEN GL® ES, is a subset of the desktop OPEN GL® which creates an interface between software and graphics. The 3D Graphic Engine (OPEN GL® ES) is implemented into generally two parts. The first part includes those functions which process the vertex and is typically implemented in the digital signal process (DSP) firmware. The second part includes those functions for pixel rendering and are implemented in a dedicated hardware graphics accelerator. The second part which performs the pixel rendering is the last pipeline stage of a conventional 3D graphic engine. The last pipeline stage processes input triangle sets to produce a pixel representation of the graphic image. However, the last pipeline stage is typically the performance bottle neck of the entire 3D graphic pipeline in the engine. Therefore, it is very important to improve the performance (in pixel per second) of the last pipeline stage for pixel rendering.

Typically, during pixel rendering operations, each input triangle needs to be processed sequentially, in the same order as the triangles are input. Thus, a processor with multi-threads is prevented from utilizing interleaved parallel processing to process an input triangle.

Furthermore, the hardware graphic accelerators are not generally flexible or easily scalable. Thus, the hardware graphic accelerators cannot easily add new features, support higher versions of the 3D graphics standard (such as OPEN GL® ES 1.0, 1.1 . . . ), support different application configurations and customize requirements. Furthermore, the hardware graphic accelerators are not easily scaled for different performance requirements (frame rate, screen size, pixel rate, triangle rate, etc. . . . ), to optimize silicon cost and system power consumption.

As can be readily seen, a dedicated hardware graphics accelerator takes up silicon area in small handheld computing devices, such as a mobile or cellular telephone. Accordingly, a dedicated hardware graphics accelerator increases the overall cost of a handheld computing device by the inclusion of the dedicated hardware graphics accelerator and IRAM used. The use of a dedicated hardware graphics accelerator also produces data traffic with the DSP which adds overhead and consumes power.

There is therefore a need in the art for techniques for a three-dimensional (3D) graphics pipeline which provide quicker pixel rendering processing without a dedicated hardware graphic accelerator.

SUMMARY

Techniques for a three-dimensional (3D) graphics pipeline which provide quicker pixel rendering processing without a dedicated hardware graphic accelerator are described herein. In an embodiment, a three-dimensional (3D) graphics pipeline includes a vertex processing stage operable to output vertex information for a 3D graphics image. A display sub-dividing stage divides pixels in a display area, having the output vertex information superimposed thereon, into sub-screens, the sub-screens forming a sub-screen task list. A pixel rendering stage processes in parallel and independently multiple sub-screen tasks in the sub-screen task list.

In another aspect, a wireless device has a digital signal processor having a plurality of processing threads, a shared memory accessed by the processing threads, and a processor. The processor is operable to perform pixel rendering without a dedicated graphics accelerator by processing in parallel and independently those pixels in multiple sub-screen tasks in a sub-screen task list stored in the shared memory. The sub-screen task includes a portion of pixels of a display area having superimposed vertex output information.

Various aspects and embodiments of the disclosure are described in further detail below.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Many game applications, require three-dimensional (3D) graphics applications with display 3D objects in a two-dimensional (2D) space (e.g., a display screen). The pixels in a 2D graphic have the properties of position, color, and brightness while a 3D pixel adds a depth property that indicates where the point lies on an imaginary Z-axis. Texture is created as 3D pixels are combined, each with its own depth value.

Figure 1:
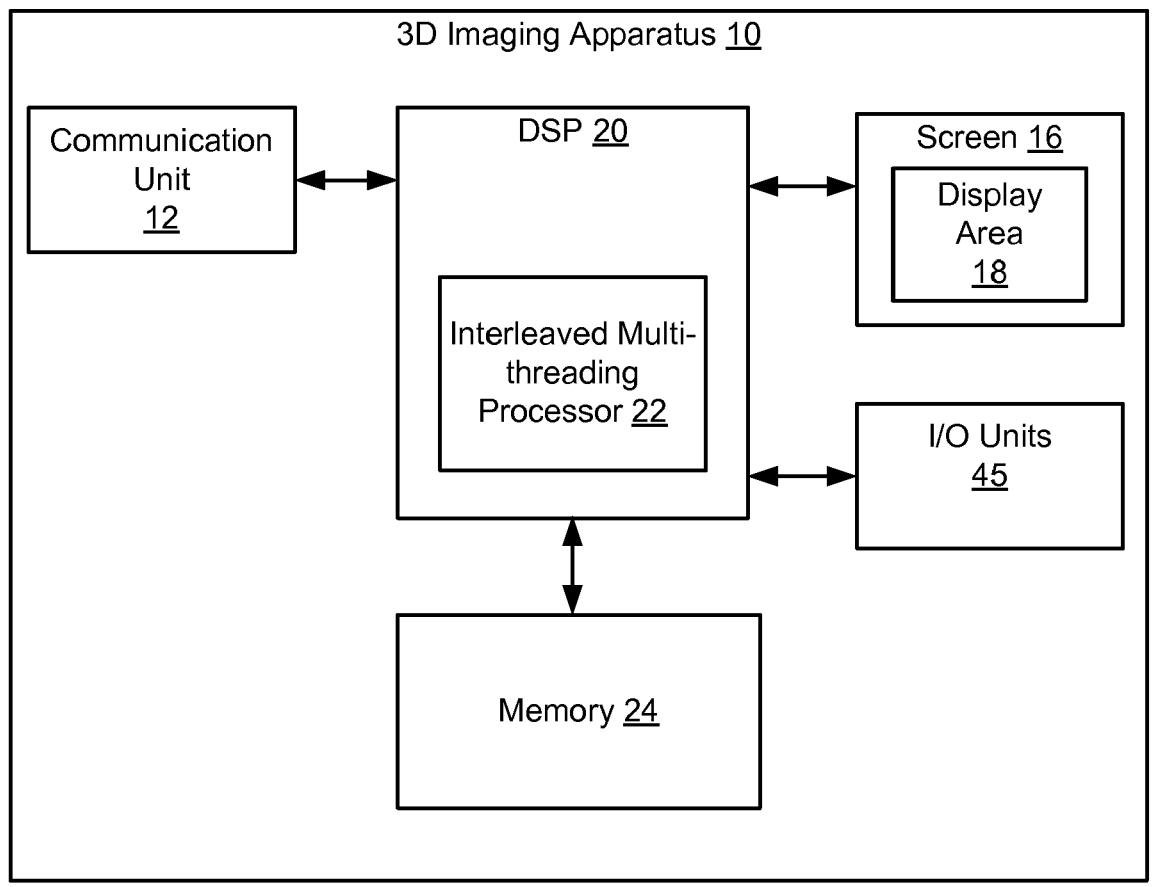
FIG. 1 illustrates a general block diagram of a 3D imaging apparatus.

Referring now to FIG. 1, an embodiment of a 3D imaging apparatus, generally designated at 10, is shown. The 3D imaging apparatus 10 includes a communication unit 12, a digital signal processor (DSP) 20, screen 16 with a display area 18, a memory 24 and Input/output (I/O) units 45. The shared memory 24 may store game applications or other applications (i.e. for two-way communications with wired or wireless networks, and other software applications) as desired by the user or to support the feature set of the apparatus 10. The I/O units 45 may include a keypad, keyboard or data communication ports. The screen 16 is operable to display in the display area 18 2D information as well as 3D graphics.

The 3D imaging apparatus 10 may include one of a personal digital assistant (PDA), and a mobile, cellular or satellite telephone, a laptop, Notebook, Tablet PC, Palm Pilot, wireless communications device or the like.

Referring now to FIGS. 2-5, in the exemplary embodiment, the DSP 20 includes an interleaved multi-threading processor 22. The interleaved multi-threading processor 22 has a plurality of processing threads (PT) PT1, PT2, . . . PTX. Each processing thread (PT) PT1, PT2, . . . PTX shares the same memory denoted as shared memory 24. Each processing thread 1, . . . X includes a respective one set of instructions $26_1 \ldots 26_X$, a core $27_1 \ldots 27_X$ (processing unit) and a register file $28_1 \ldots 28_X$. The output of each core $27_1 \ldots 27_X$ communicates with the shared memory 24. The instructions $26_1 \ldots 26_X$ include the programming code for carrying out the operations defined below and other operations for carrying out the feature set, such as multi-media) of the 3D imaging apparatus 10. The core $27_1 \ldots 27_X$ executes the instructions $26_1 \ldots 26_X$.

The register file $28_1 \ldots 28_X$ is a set of general purpose registers and is the center stage of the DSP 20 or a microprocessor. These register files $28_1 \ldots 28_X$ hold all the operands (typically loaded from memory), that is, hold all the results from all operations (such as arithmetic op, logic op, etc.) before storing the results into the shared memory 24.

Some DSP architectures have four threads. Nevertheless, the DSP 20 can have more than four threads such as, without limitation, six processing threads which run in parallel. In the exemplary embodiment, each thread (PT) PT1, PT2, . . . PTX in parallel provides 100 million instruction packets per second (MIPS). Each instruction packet can be four (4) instructions, two (2) instructions (Sup-scalar) or just one instruction. However, one instruction is not recommended for efficiency, because the architecture of the DSP 20 removes the inefficiency caused by inter-instruction data dependency.

The terms thread or multi-threading are used to describe concurrent task execution. Instead of a single path of execution, a program (Operations) may be split into multiple execution threads which execute simultaneously. In the exemplary embodiment, there is a starting thread which requires a function call (or instruction), and usually requires at least two arguments: (1) the address of the start instruction; and (2) a context argument. While a thread is operating and/or exiting, the thread needs to be able to do two basic jobs in relation to other processing threads: (1) acquire a shared resource and block other threads from using such resource; and (2) safely send messages to other threads (e.g. done, ready, etc.)

Figure 4:
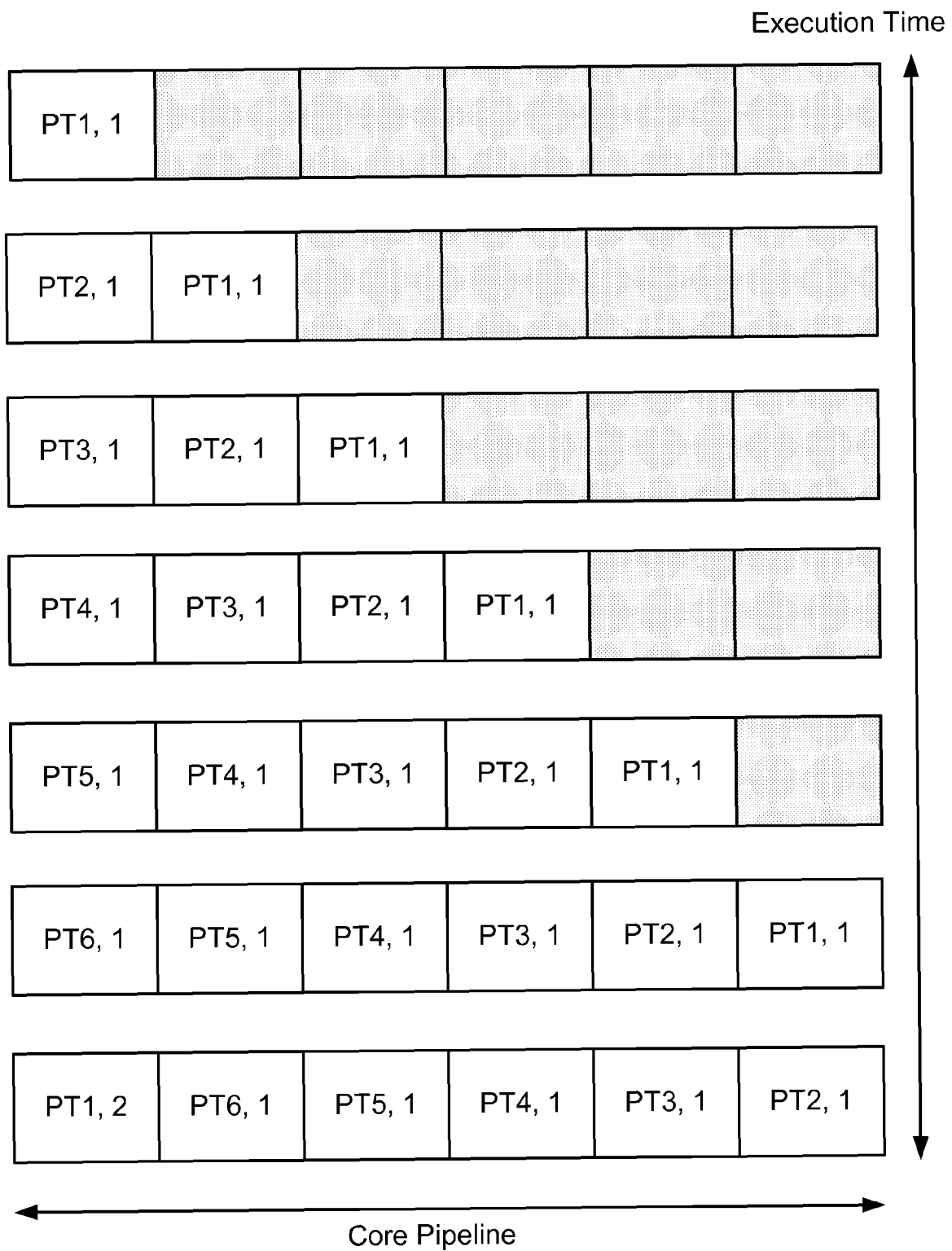
FIG. 4 illustrates a graph of the execution time versus the core pipeline of the interleaved instructions processed by the multi-threading processor with six threads.

Referring now to FIG. 4, a graph of the interleaved multi-threading parallel processing is shown. In this example, there are six (6) processing threads PT1, PT2, PT3, PT4, PT5 and PT6. The first processing thread PT1 processes a first instruction set 1. This is represented by the first (top) row of the execution time line for the core pipeline. The core pipeline is denoted by cores $27_1, \ldots 27_X$. While the first instruction set 1 is processed by the first processing thread PT1, the second processing thread PT2 processes its first instruction set 1. This is represented by the second row of the execution time line. Thus, the first instruction sets 1 are being parallel processed.

The third processing thread PT3 processes its first instruction set 1 while the first and second processing threads PT1 and PT2 process their first instruction sets 1. This is represented by the third row of the execution time line for the core pipeline. The fourth processing thread PT4 processes its first instruction set 1. Meanwhile, the first, second and third processing threads PT1, PT2 and PT3 continue processing their associated first instruction sets 1. This is represented by the fourth row of the execution time line for the core pipeline.

The fifth processing thread PT5 processes its first instruction set 1 while the first, second, third and fourth processing threads PT1, PT2, PT3 and PT4 continue processing their first instruction sets 1. This is represented by the fifth row of the execution time line for the core pipeline. The sixth processing thread PT6 processes its first instruction set 1 while the first, second, third, fourth and fifth processing threads PT1, PT2, PT3, PT4 and PT5 continue processing their first instruction sets 1. This is represented by the sixth row of the execution time line for the core pipeline. Thus, the processing of instructions by the processing threads is interleaved.

Referring now to the seventh (bottom) row of FIG. 4, assuming that the first processing thread PT1 has completed its first instruction set 1, the first processing thread PT1 begins processing a second instruction set 2 while the second, third, fourth, fifth and sixth processing threads PT2, PT3, PT4, PT5 and PT6 continue processing their first instruction sets 1. Hence, the processing of each of the processing threads PT1, PT2, . . . PTX are in parallel and interleaved.

Figure 5:
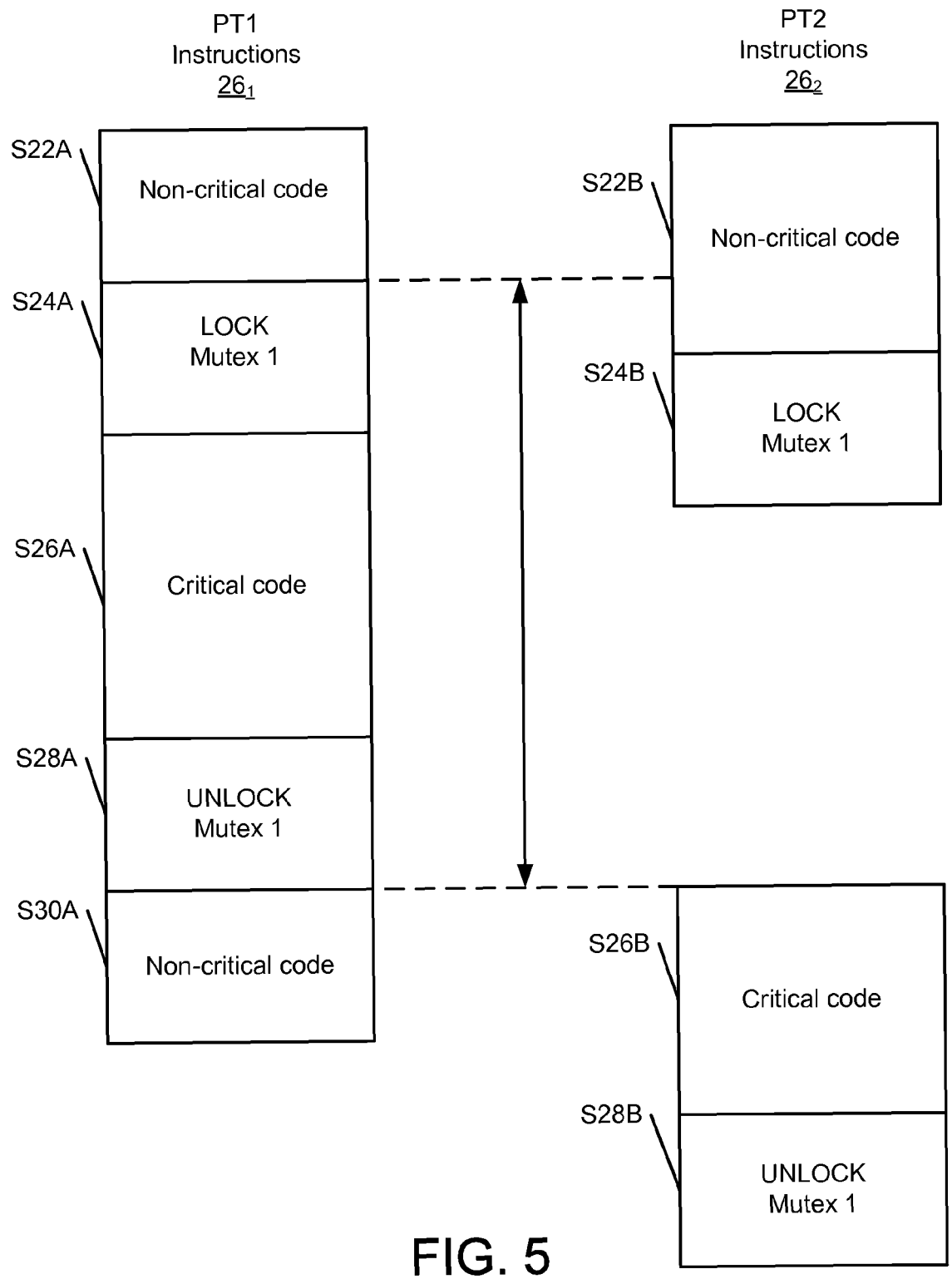
FIG. 5 illustrates two parallel instruction sets processed by two threads.

Describing the interleaved processing for all processing threads is prohibitive. Thus, for illustrative purposes, the interleaved processing using instructions $26_1$ and $26_2$ is shown in FIG. 5 as it relates to a mutex. A mutex is a tool that is "owned" by only one processing thread at a time. When a processing thread tries to acquire a mutex, it LOCKS the mutex. On the other hand, if the mutex is already LOCKED, that processing thread is halted. When the owning thread UNLOCKS the mutex, the halted thread is restarted and acquires ownership of the mutex. This process is shown in FIG. 5.

Starting with the first processing thread PT1, instructions $26_1$ beings with step S22A where non-critical code is executed. Step S22A is followed by step S24A where the first processing thread PT1 executes a LOCK mutex 1 instruction (assuming, the mutex 1 is UNLOCKED). Thus, the first processing thread PT1 now owns the mutex 1. Step S24A is followed by step S26A where critical code is executed. Step S26A is followed by step S28A where after the critical code is completed, the first processing thread PT1 executes an UNLOCK mutex 1 instruction. Thereafter, the first processing thread PT 1 resumes execution of non-critical code at step S30A.

In parallel with the first processing thread PT1, the second processing thread PT2 begins instructions 26₂ at step S22B where non-critical code is executed. Step S22B is followed by step S24B where the second processing thread PT2 wants to LOCK the mutex 1 at step S24B. However, the mutex 1 is in a LOCKED state. Thus, the operations of the second processing thread PT2 are halted until the first processing thread PT1 UNLOCKS the mutex 1 at step S28A. Then step 26B commences where the critical code may be executed. Step S26B is followed by step S28B where after the critical code is completed, the second processing thread PT2 executes an UNLOCK mutex 1 instruction. Other instructions may continue thereafter.

The mutex tool or another token tool is used to guarantee serial execution of critical sections in different processing threads only as needed. This is also serializing execution which means that certain code may not be executed in parallel when it could conflict with the execution of code by other threads. The mutex tool is helpful because a shared memory 24 (shared resource) is used.

Figure 6:
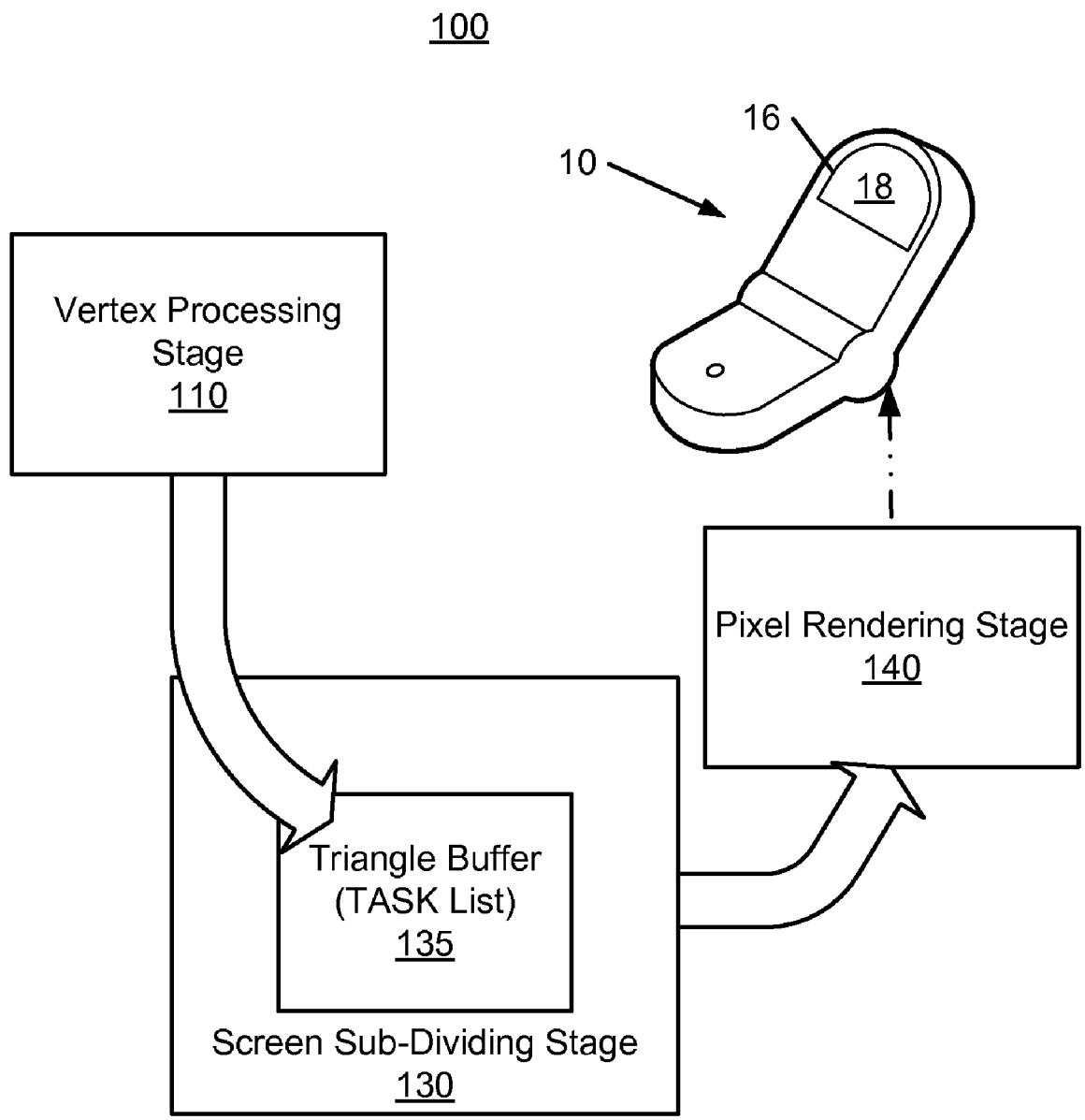
FIG. 6 illustrates a general flow diagram of the 3D graphics pipeline in an exemplary 3D imaging apparatus.
Figure 7:
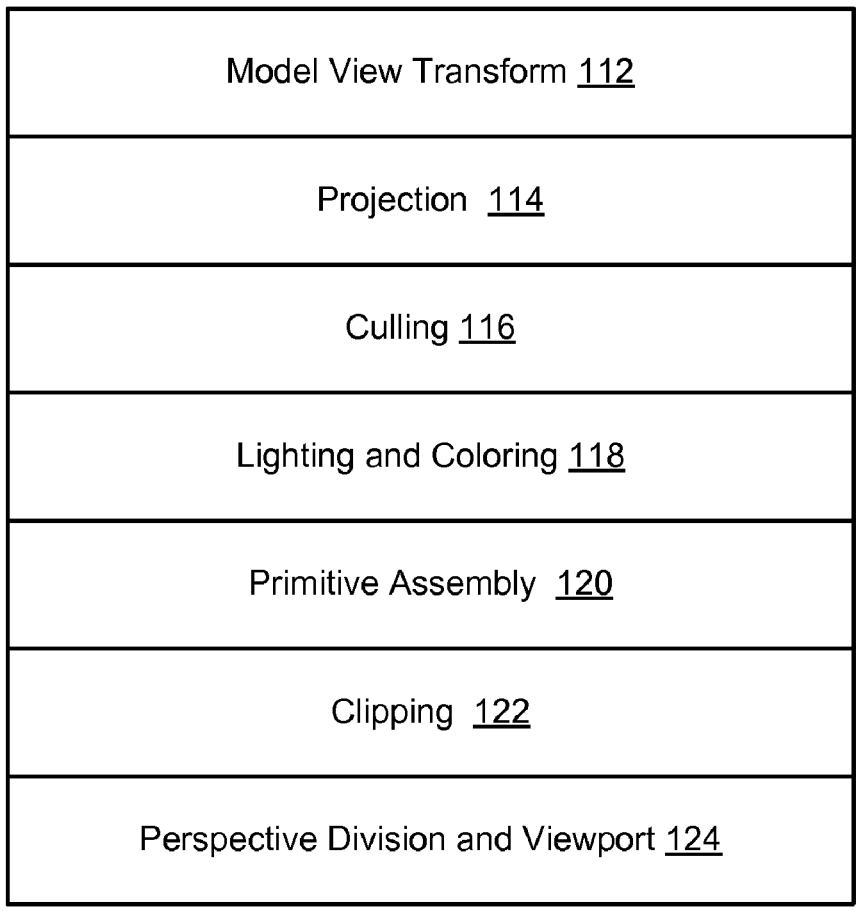
FIG. 7 illustrates a general block diagram of the processes of the 3D graphics pipeline.
Figure 7:
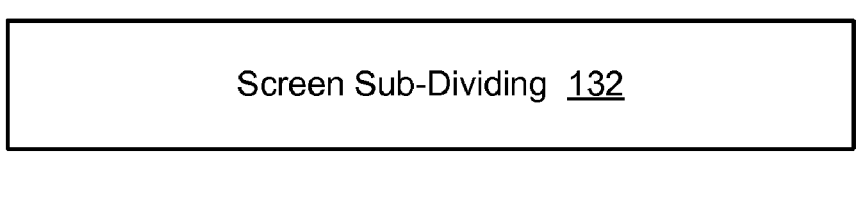
Figure 7:
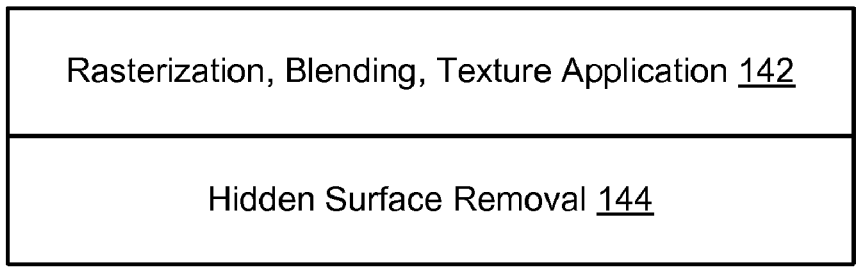

Referring now to FIGS. 6 and 7, there is shown an embodiment of a general flow and block diagrams of the 3D graphics pipeline, generally designated at 100. The 3D graphics pipeline 100 divides the entire task of 3D representation in the display area 18 of screen 16 into generally three (3) pipeline stages: a vertex processing (VP) stage 110, a screen sub-dividing (SSD) stage 130 and a pixel rendering (PR) stage 140. In operation, the vertex processing (VP) stage 110 includes all the functions or a subset of the functions currently implemented in the OPEN GL® or OPEN GL® ES and is processed by a digital signal processor (DSP) 20. The line to the screen 16 is shown in phantom because the screen 16 is not part of the 3D graphics pipeline 100.

The VP stage 110 includes model view transform operations 112, projection operations 114, culling operations 116, lighting and coloring operations 118, primitive assembly operations 120, clipping (i.e. user-defined clipping) operations 122, and perspective division and viewport operations 124. Each of these operations of the VP stage 110 are well defined in the OPEN GL® or OPEN GL® ES.

In general, the model view transform operations 112 use math operations to place object models into desired positions and orientations. The projection operations 114 use math operations that make close things large and far things smaller. Occlusion draws near objects in front of far ones. Culling and clipping operations 116 and 122 discard things that are not in view. Lighting operations 118 calculate the effects of lights on surfaces.

Figure 2:
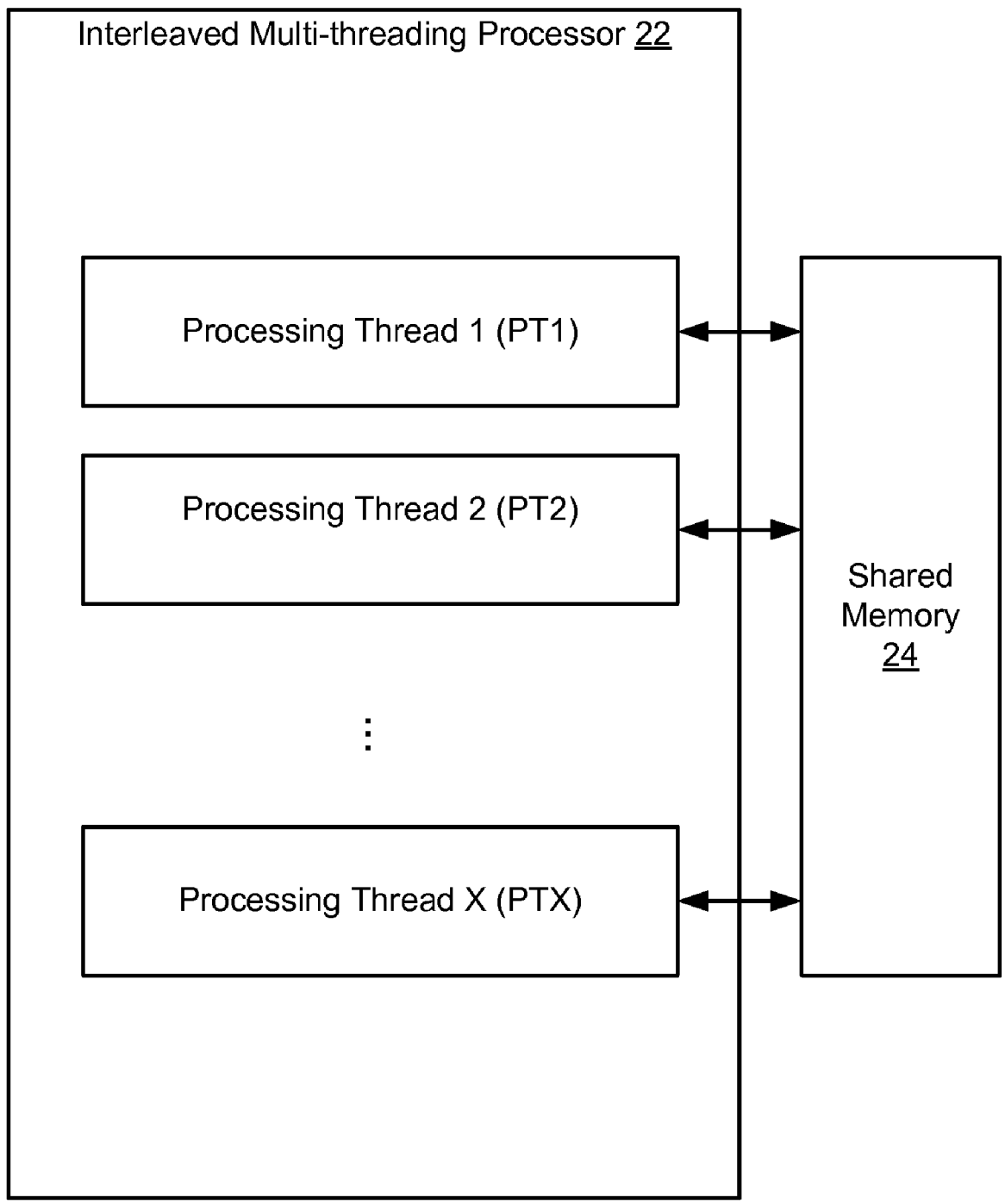
FIG. 2 illustrates an interleaved multi-threading processor interfaced with shared memory.
Figure 3:
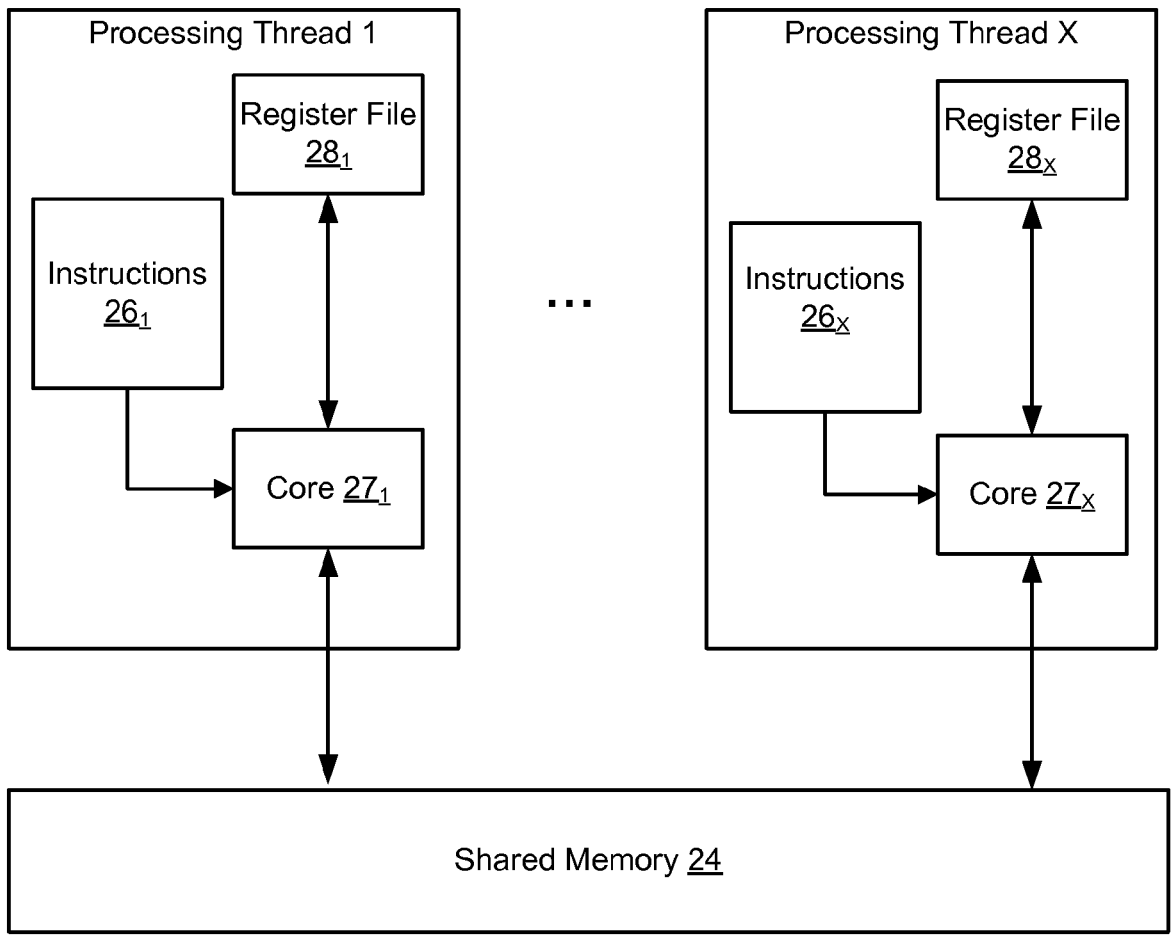
FIG. 3 illustrates details of the interleaved multi-threading processor with details of each thread shown.

In the exemplary embodiment, the VP stage 110 can be implemented with one processing thread (FIGS. 2 and 3). The vertex output information includes vertex information to define a triangle and its location in the display area 16. The vertex output information is superimposed on the display area 16 in that the pixels of the display area 16 include the vertex output information to define triangles in accordance with the OPEN GL®, OPEN GL® ES, or other graphics libraries.

Figure 11:
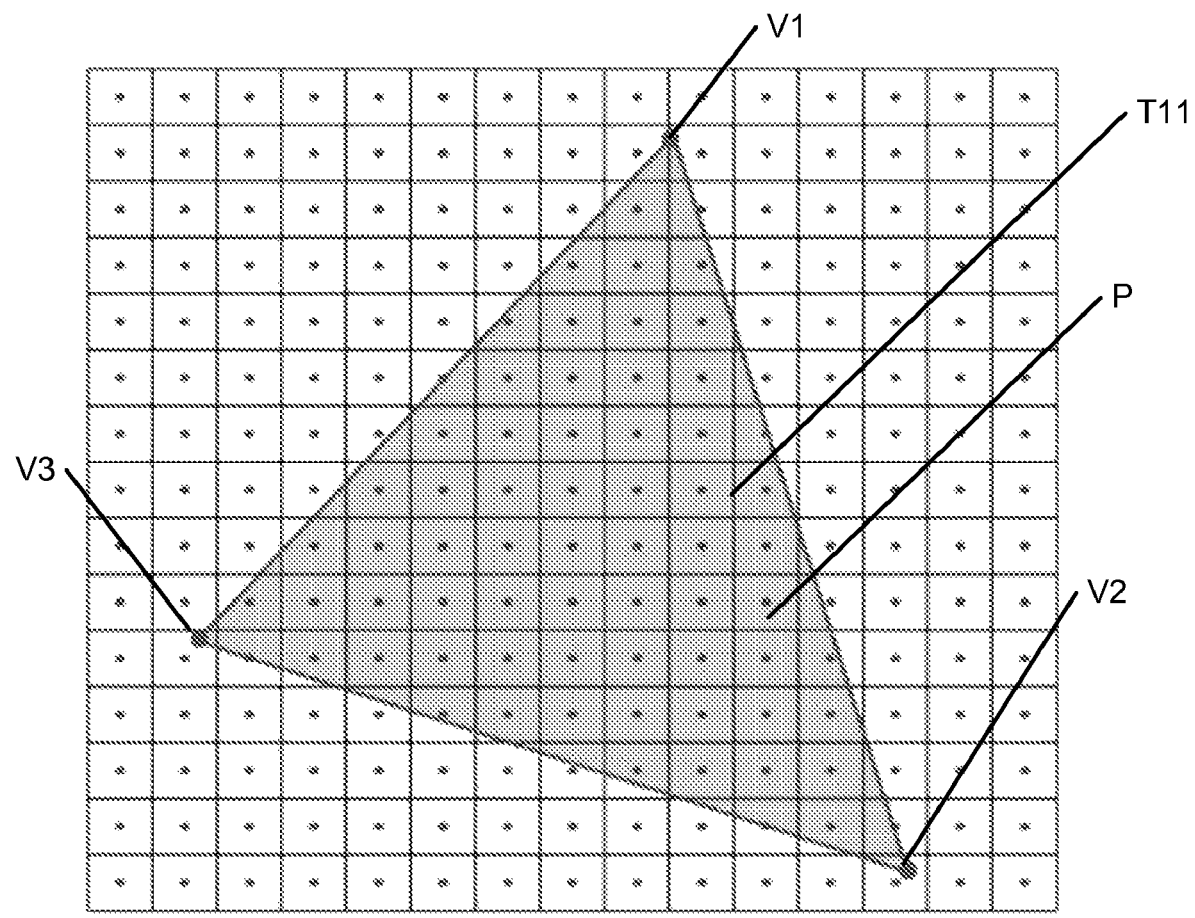
FIG. 11 illustrates a triangle defined by vertex coordinates with a plurality of pixels.

The screen sub-dividing (SSD) stage 130 includes screen sub-dividing operations 132 which divide the display area 18 into M*N sub-screens. The display area 18 is made up of a plurality of pixels P (FIG. 11) with the vertex output information superimposed. The vertex information from the VP stage 110 provides vertex information (such as V1, V2 and V3 of FIG. 11) defining triangles (such as, T1, and T2 of FIG. 8A) for superposition in the display area 18. The vertex information may include vertex coordinates and edge information. In general, the vertex output information for each triangle is just a set of mathematical descriptions to define a closed area. This set of math-descriptions is stored in the shared memory 24 so that each processing thread (PT1, PT2, ... PTX) can use the set of math descriptions to compute each pixel P (FIG. 11) within its own sub-screen task and decide if the pixel is inside a triangle or not.

Figures 8A, 8B:
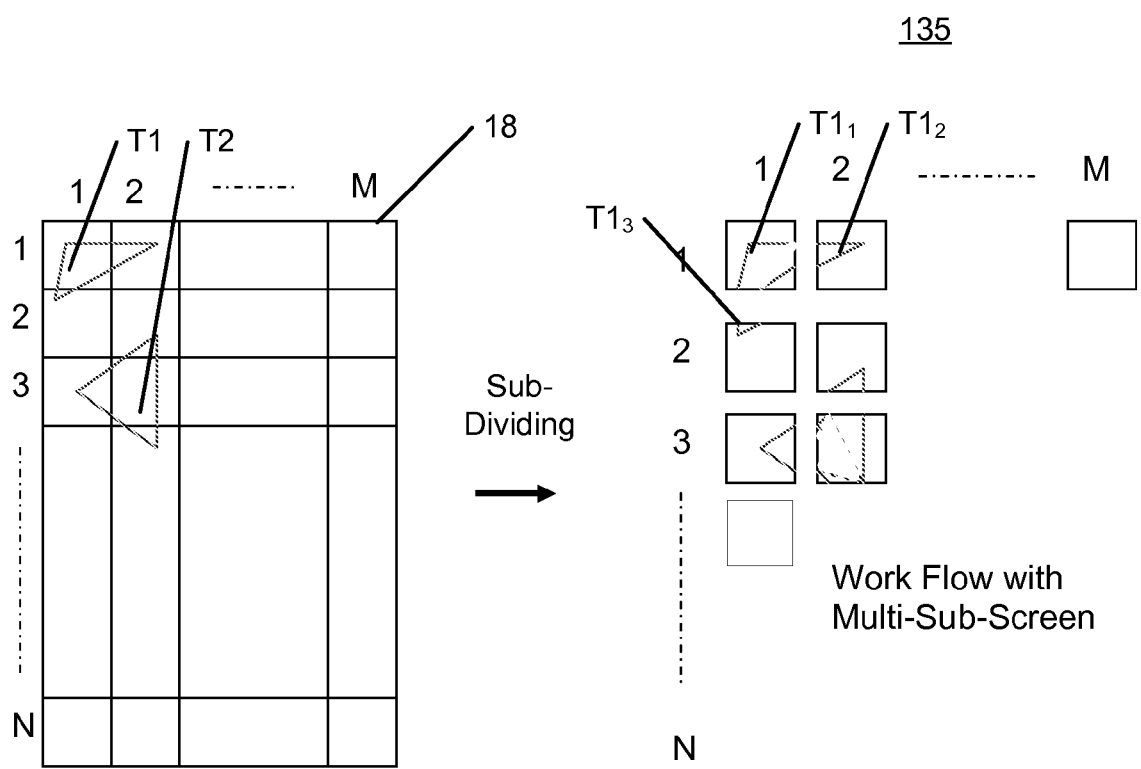
FIG. 8A illustrates the display space being sub-divided into a M×N grid where M>1 and N>1.
FIG. 8B illustrates the TASK list for processing the sub-divided display space of FIG. 8A.

FIG. 8A illustrates vertex output information superimposed on the display area 18. During the screen sub-dividing (SSD) stage 130 the display area 18 is sub-divided by dividing or grouping the pixels that makeup the display area 18 into M×N sub-screen tasks as best seen in FIG. 8B. The M×N sub-screen tasks are M×N independent tasks stored in the shared memory 24. The operations of the SSD stage 130 can be implemented using a processing thread which is separate from the processing thread used during the VP stage 110. Alternately, the operations of the SSD stage 130 can be combined with the operations of the VP stage 110 on the same processing thread.

Figure 9:
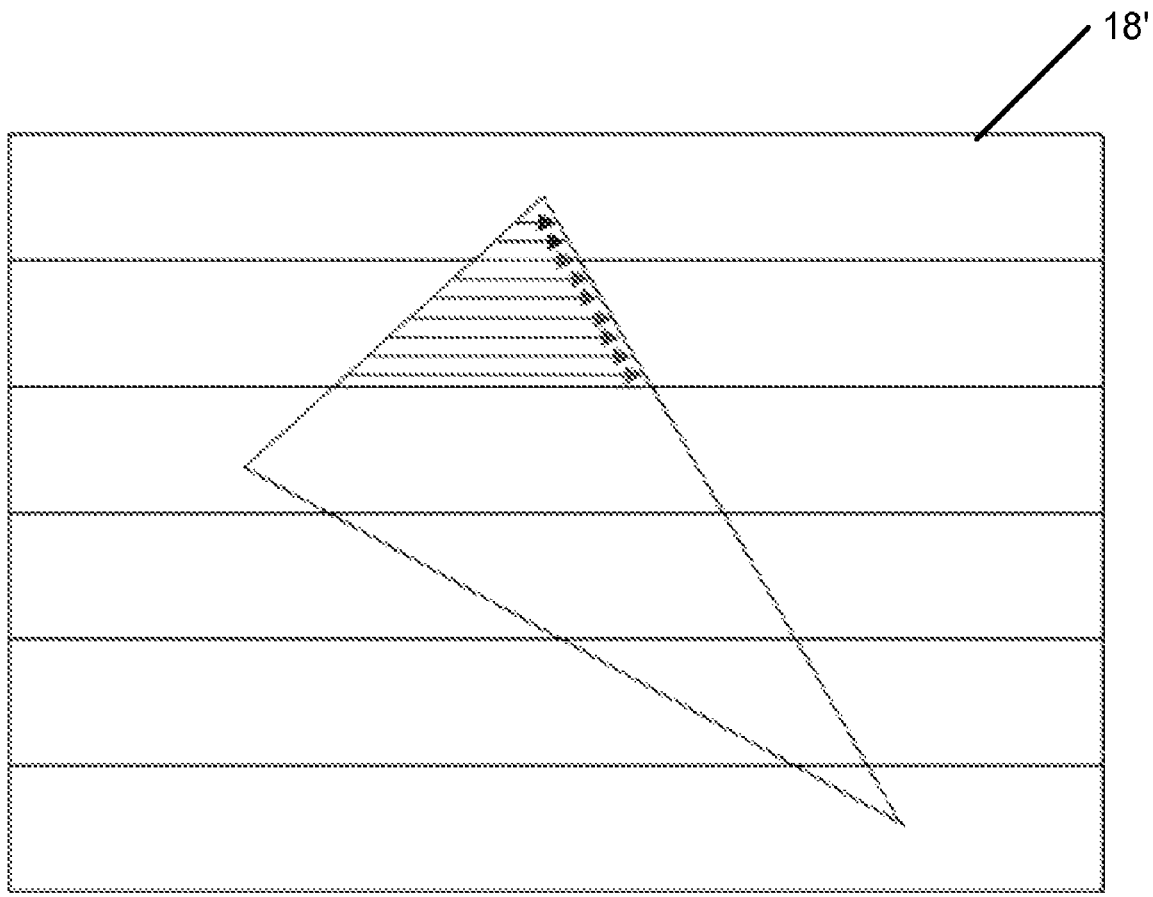
FIG. 9 illustrates the display space being sub-divided into a M×N grid where M=1 and N>1.
Figure 10:
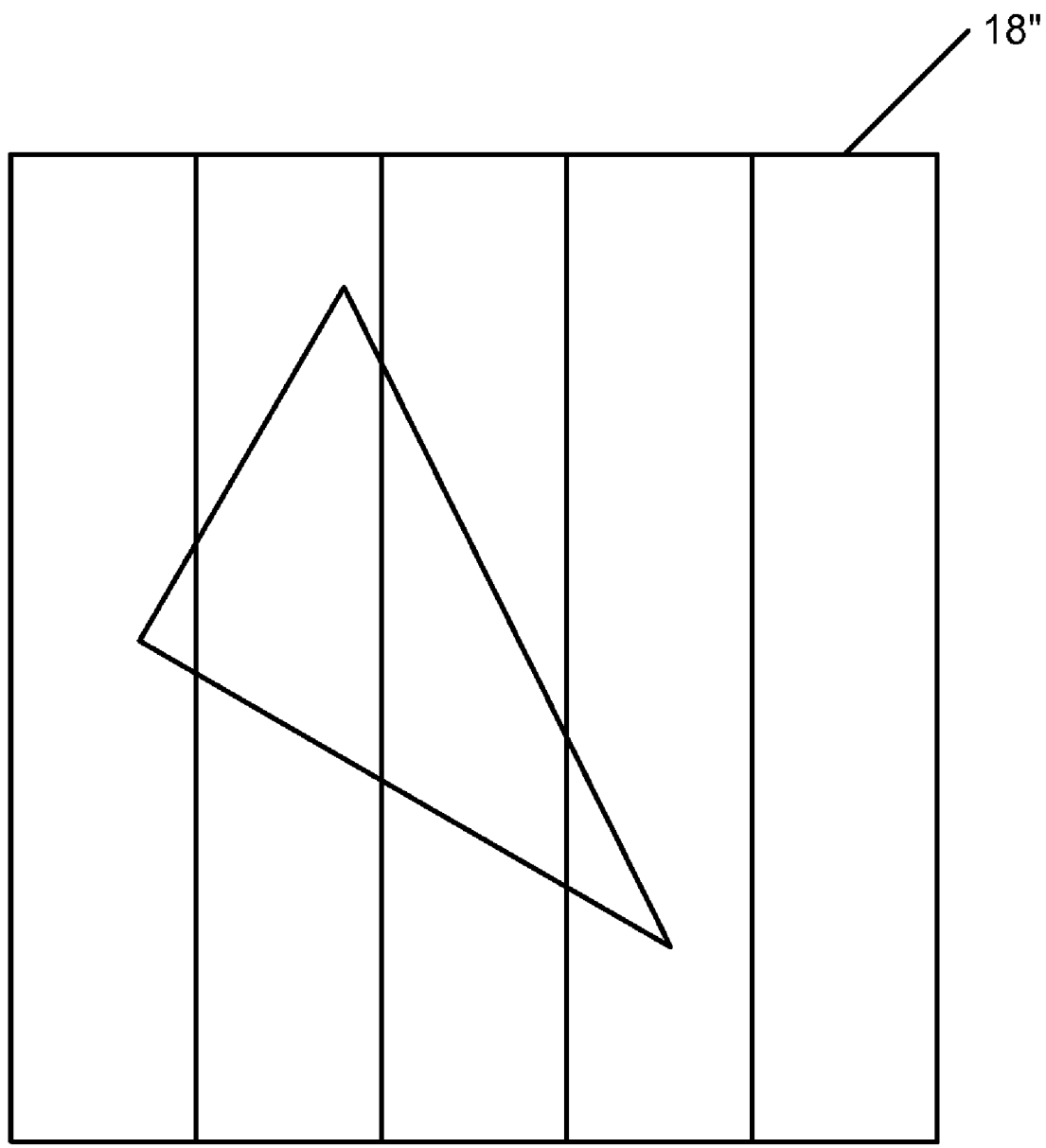
FIG. 10 illustrates the display space being sub-divided into a M×N grid where M>1 and N=1.

In the embodiment shown in FIG. 8A, the display area 18 is divided into M×N sub-screens wherein M>1 and N>1 to create a grid. For illustrative purposes, FIG. 9 shows the display area 18' divided into M×N sub-screens wherein M=1 and N>1. The arrows illustrate the scan or work flow direction. With reference to FIG. 10, the display area 18" is divided into M×N sub-screens wherein M>1 and N=1. Thus, the sub-screens of display area 18" form a series of columns.

The pixel rendering (PR) stage 140 includes rasterization, blending, and texture application operations 142 and hidden surface removal operations 144. Nevertheless, the pixel rendering stage 140 may include other operations defined by OPEN GL® or OPEN GL® ES. The PR stage 140 converts the information about 3D objects from the VP stage 110 into a bit map that can be displayed in the display area 18 of screen 16. The PR stage 140 processes input triangle sets to produce a pixel representation of a 3D graphic image.

A typical pixel rendering (PR) stage may first take a triangle from a list of the vertex output information. Next the PR stage would take a pixel from the display area and compute the pixel against the triangle to see if it is inside the triangle. If the pixel under evaluation is inside the triangle, the PR stage may perform coloring of the pixel with the corresponding color from the triangle. If the pixel under evaluation is not inside the triangle, the pixel is skipped. The PR stage would then pick the next pixel in the display area 18. The PR stage repeats the above process for other pixels in the display area 18 until all pixels have been evaluated or processed for a triangle. Thus, pixels are processed one at a time.

Then, the typical PR stage would move to the next triangle in the list of vertex output information and repeat the evaluation of the pixels for the current triangle.

The PR stage 140 works in a similar manner with multiple sub-screens or sub-screen tasks. The difference is that the sub-screens have a smaller number of pixels to evaluate or process and multiple sub-screens can be processed independently and in parallel by the processing thread (PT1, PT2, ... PTX). Thus, the processing time for the PR stage 140 is much quicker then a typical PR stage because less pixels are in each sub-screen and multiple sub-screens can be processed in parallel (with each processing thread working independently towards processing the pixels in a respective one sub-screen).

In the exemplary embodiment, the PR stage 140 is processed using a set of the multiple processing threads PR1, PR2, ... PRX of the interleaved multi-threading processor 22.

The number of threads in the set used for the PR stage 140 may be 2 or more with a maximum of X threads.

In operation, each processing thread PR1, PR2, ... PRX assigned to the pixel rendering stage 140 seizes an available sub-screen task from the Task list 135 and removes it from the Task list 135. The set of processing threads PR1, PR2, ... PRX process, in interleaved parallel operations, input triangles to render the pixels in the sub-screens (convert the input triangle information into a bit map for display in the sub-screens). After, a respective one processing thread has completed the pixel rendering operations for the seized sub-screen task, the processing thread moves to the next available sub-screen task in the Task list 135. This operation is repeated until all sub-screens have been processed and the pixel rendering stage 140 is complete.

The interleaved multi-threading processor 22 allows the multi-thread processing to be scalable and homogeneous. The operation $\hat{O}$ can be defined by $$\hat{O}(A+B) = \hat{O}(A) + \hat{O}(B); \text{ and}$$

$$\hat{O}\left(\sum_i T_i\right) = \sum_i \hat{O}(T_i)$$

Figure 12:
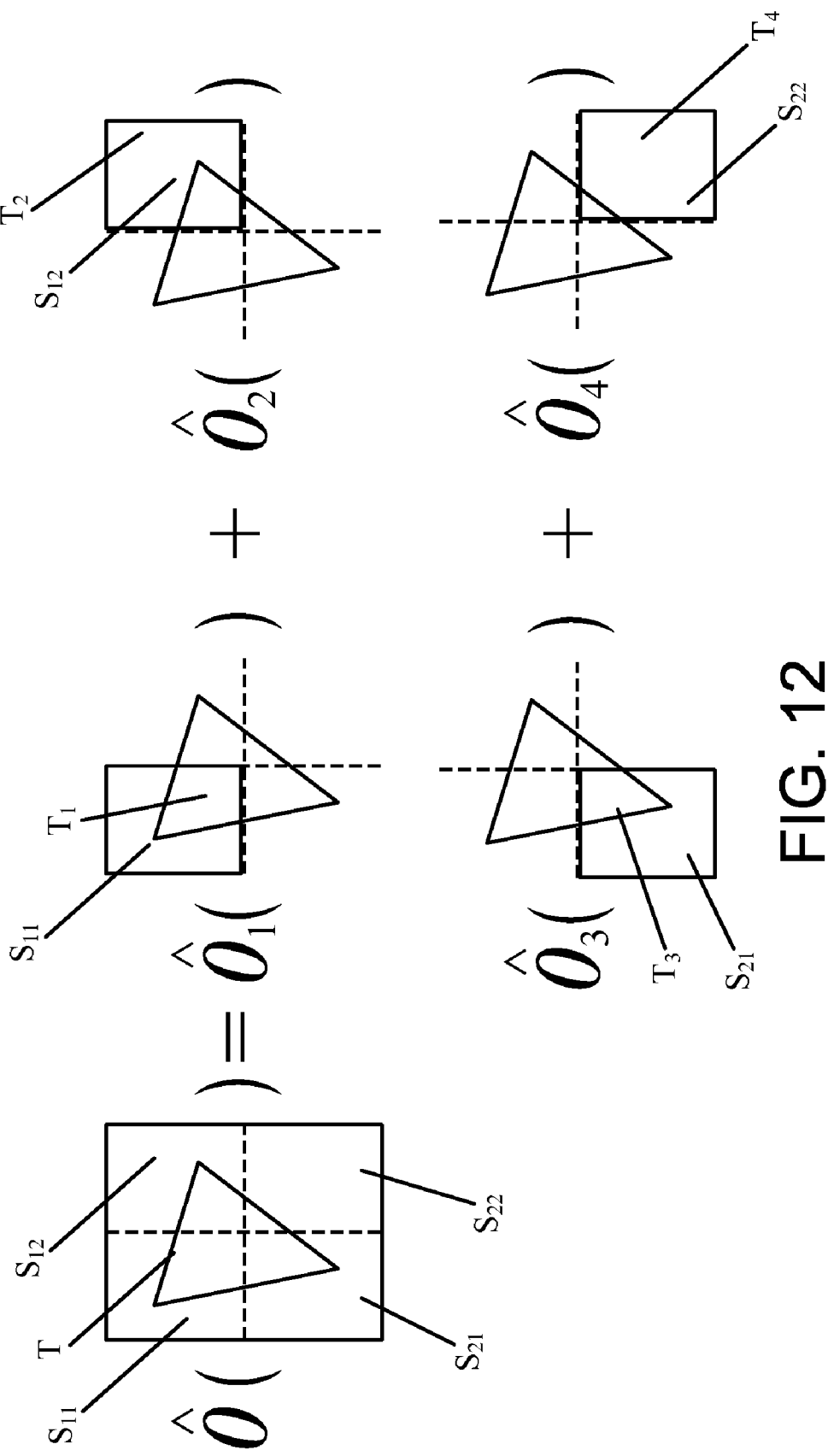
FIG. 12 illustrates a graphical representation of the instruction operations for processing a triangle in an area sub-divided into a set of four sub-divided areas.

With reference to FIG. 12, a block of four sub-screens with a single triangle T is shown for pixel rendering. The operation $\hat{O}$ processes sub-screen tasks $S_{11}, S_{12}, S_{21}$ and $S_{22}$ represented as four (i) sub-screens each with a sub-divided portion (i) of a triangle T. The operation $\hat{O}$ is thus equal to operation $\hat{O}_1$ of the sub-screen $S_{11}$ plus operation $\hat{O}_2$ of the sub-screen $S_{12}$ plus operation $\hat{O}_3$ of the sub-screen $S_{21}$ plus operation $\hat{O}_4$ of the sub-screen $S_{22}$. If all of the operations $\hat{O}_1, \hat{O}_2, \hat{O}_3$ and $\hat{O}_4$ are processed in parallel, the overall peak performance for processing the pixel rendering stage 140 is thus the peak performance for a processing thread multiplied by the number of processing threads used. The sub-screen $S_{11}$ has a sub-divided portion $T_1$ of pixels for triangle T. The sub-screen $S_{12}$ has a sub-divided portion $T_2$ of pixels for triangle T. The sub-screen $S_{21}$ has a sub-divided portion $T_3$ of pixels for triangle T. The sub-screen $S_{22}$ has a sub-divided portion $T_4$ of pixels for triangle T. For illustrative purposes, the number of threads is four (4). Hence, in this example, the performance would be the performance for one processing thread multiplied by the number of the processing threads. Thus, the PR stage 140 is a quick pixel rendering stage by virtue of its ability to process in parallel pixels from multiple sub-screens.

In addition, the numbers of M and N can be configured after profiling with real application, so that the performance can be further optimized for different situations. Configuring M and N provides another dimension of greater flexibility and scalability. Profiling includes identifying the loading (tick count) of the processing thread or the size or complexity of the operational tasks. Profiling may also include evaluating other components such as parameters associated with the transfer of data and memory capacity from the shared memory 24. With profiling and adjustment, frame rate, screen size, pixel rate, triangle rate, etc. could be used to change or vary M and N and/or to vary the number of processing threads PR1, PR2, ... PRX for use in the PR stage 140. The remaining processing threads PR1, PR2, ... PRX are used for other applications which are running concurrently, such as game-audio.

Figure 13:
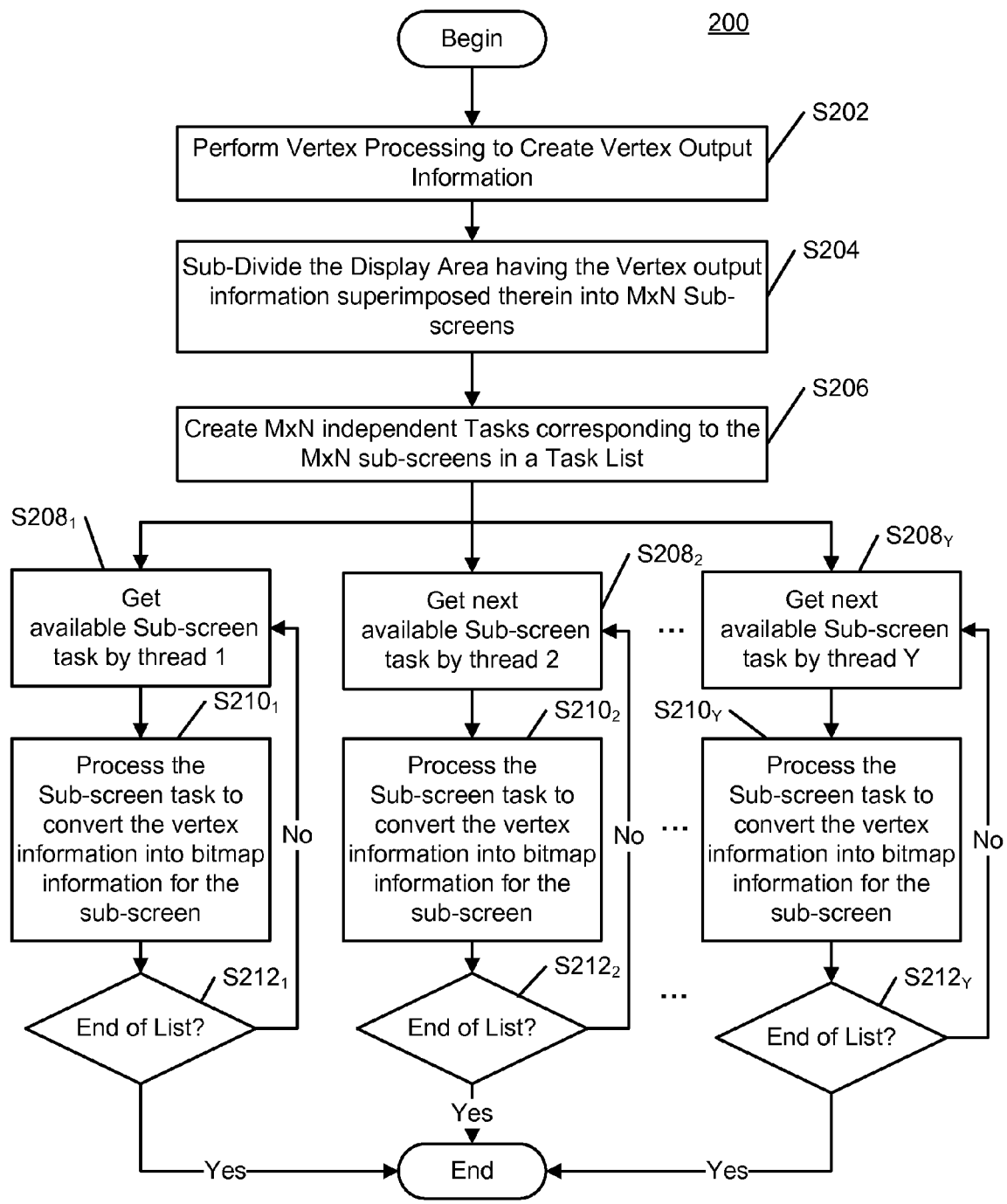
FIG. 13 illustrates the flowchart of the 3D graphic pipeline method using a multi-threading processor.

Referring now to FIG. 13, the flowchart of the 3D graphics pipeline method 200 for use by the 3D graphics pipeline 100 is shown. The method 200 begins with step S202 where the vertex processing is performed to create vertex output information. Step S202 is followed by step S204 where the display area 18, having the vertex output information superimposed therein, is sub-divided into M×N sub-screens. For example, as best seen in FIG. 8A, the triangle T1 expands across the sub-screens $S_{11}, S_{21}$ and $S_{22}$ and is sub-divided into its respective sub-divided portions $T1_1, T1_2, T1_3$ shown in FIG. 8B. Thus, the Task list 135 in FIG. 8B illustrates the sub-divided portions of triangles T1 and T2 (only two triangles shown for illustrative purposes). As can be appreciated, those entries in the Task list 135 from the vertex output information that does not have associated therewith a triangle or has a smaller sub-divided portion of a triangle may be processed quicker. Hence, before the pixel rendering stage 140 displays a 3D image representative of the triangle on the display area 18, the processing for all sub-divided portions of the triangle should be complete.

Step S204 is followed by step S206 where the sub-screen tasks with or without sub-portions of the triangles are created and placed in the Task list 135. Step S206 is followed by step S208$_1$, 208$_2$, and 208$_Y$ where Y is the number of the processing threads (2 or more) in the set used for the pixel rendering stage 140. At step S208$_1$, the first processing thread (hereinafter referred to as "thread 1") gets the (first) available sub-screen task (FIG. 8B), processes each pixel in the sub-screen task at step S210$_1$ (especially those pixels determined to be within or inside of a triangle or triangle portion associated with the task). Step S210$_1$ is followed by step S212$_1$ where a determination is made whether it is the end of the Task list 135. If the determination is "YES," the processing by thread 1 is ended. Otherwise, if the determination is "NO," step S212$_1$ returns to step S208$_1$. The operation of second processing thread (hereinafter referred to as "thread 2") is essentially the same. Thread 2 gets or seizes the next available sub-screen task in the Task list 135. Step S208$_2$ is followed by step S210$_2$ where the sub-screen task is processed. Step S208$_2$ is followed by step S210$_2$. Step S210$_2$ is followed by step S212$_2$. At step S212$_2$, a determination is made whether there are any more tasks in the Task list 135. If the determination at step S212$_2$ is "NO," the method ends. Otherwise, if the determination is "YES," step S212$_2$ returns to step S208$_2$.

Step S208$_Y$ gets or seizes the $Y^{th}$ available sub-screen task by thread Y. Step S208$_Y$ is followed by step S210$_Y$ where the sub-screen task is processed. Step S210$_Y$ is followed by step S212$_Y$ where a determination is made whether there are any more tasks in the Task list 135. If the determination is "NO," the method ends. Otherwise, if the determination is "YES," step S212$_Y$ returns to step S208$_Y$.

The processing carried out during step S210$_1$, S210$_2$ and S210$_Y$ performs the rasterization, blending, texture application operations 142 and the hidden surface removal operations 144. With specific reference to FIG. 11, the squares with a center dot denote pixels P. Some of the pixels P are inside of the triangle T11 while some pixels are outside of the triangle T11. Each vertex V1, V2 and V3 has a color value attached with smooth shading. Linear interpolation is used to calculate the color values at each pixel P. The vertexes V1, V2 and V3 are used to form triangle T11 and locate such triangle within the display area 18. The colors are calculated at each pixel center, denoted by the black dot, in the center of the square. Various parameters are interpolated including a Z-depth, alpha, fog and texture.

Referring again to FIGS. 2-4, in this example, there are six (6) threads PT1, PT2, PT3, PT4, PT5 and PT6. The first thread PT1 can be used to process the VP stage 110. The second thread PT2 can be used to process the SSD stage 130. The remaining four threads PT3, PT4, PT5 and PT6 would be used to process sub-screen tasks from the Task List 135 in parallel. Here, the processing thread PT3 would get the first available sub-screen task 1,1 and process the pixels in the seized first sub-screen task 1,1. The processing thread PT4 would get the next ($2^{nd}$) available sub-screen task 1,2 and process the pixels in the seized sub-screen task 1,2. The processing thread PT5 would get the next ($3^{rd}$) available sub-screen task 1,3 and process the pixels in the seized sub-screen task 1,3 (assuming M is greater than 3).

Assuming M is 4, the processing thread PT6 would get the next ($4^{th}$) available sub-screen task 1,M and process the pixels in the seized sub-screen task 1,M. As the processing threads PT3, PT4, PT5 and PT6 complete their each sub-screen task, additional sub-screen tasks would be seized and processed in parallel until the Task list 135 is empty.

If one processing thread performs 3 Mpixel/sec rendering, it would take approximately 30 instruction packets to process one pixel. This is about 100 instructions per pixel in average. Reserving two of the six threads for the VP stage 110 and the SSD stage 130, with the remaining four processing threads to do the pixel rendering, would support a VGA resolution which is four times the performance (12M pixel/sec) of a dedicated hardware graphics accelerator.

Because all processing threads share the same memory 24, the processing threads can all process the same set of input triangle data (sub-screen tasks) very efficiently (without duplication) using the mutex tool.

The pixel rendering stage 140 is the last pipeline stage of the 3D graphics pipeline 100. The PR stage 140 processes the input triangle list to produce a pixel representation of a 3D graphic image. The 3D graphics pipeline 100 described above improves the performance (in pixel per second) of the PR stage 140. The interleaved multi-thread processor 22 increases the performance by a multiple of the number of the processing threads running in parallel to process the Task list 135.

An advantage of the 3D graphics pipeline architecture is its flexibility in allowing adjustment of the numbers M and N. By increasing the number M and N, the MIPS requirement decreases for the pixel rendering stage 140. Because each sub-screen becomes smaller, the rendering task becomes simpler. This helps to increase the performance of multiple processing threads. The processing threads can also be used for other concurrent applications, such as audio.

As can be readily seen, the software implementation, described herein, for rendering 3D graphic images has a higher performance than hardware implementation of a dedicated graphics accelerator. In comparison to a hardware implementation of a graphics accelerator, the embodiment described herein is flexible and scalable. Because the embodiment is flexible, it is easy to extend the software code for adding new features, support higher versions of the 3D graphics standard of (such as OPEN GL® ES 1.0, 1.1 . . . ), and support different application configurations and custom requirements. The scalable feature of the embodiment allows for different performance requirements (frame rate, screen size, pixel rate, triangle rate, etc. . . . ), to optimize silicon cost and system power consumption This embodiment also enables the software implementation to be used with a low cost and low power processor, instead of using a high end processor with multi-GHz clock speed to reach the same performance.

In exemplary embodiments, the methods and processes described herein may be implemented in hardware, software, firmware, or any combination thereof in a form of a computer program product comprising one or more computer-executable instructions. When implemented in software, the computer program product may be stored on or transmitted using a computer-readable medium, which includes computer storage medium and computer communication medium.

The term "computer storage medium" refers herein to any medium adapted for storing the instructions that cause the computer to execute the method. By way of example, and not limitation, the computer storage medium may comprise solid-sate memory devices, including electronic memory devices (e.g., RAM, ROM, EEPROM, and the like), optical memory devices (e.g., compact discs (CD), digital versatile discs (DVD), and the like), or magnetic memory devices (e.g., hard drives, flash drives, tape drives, and the like), or other memory devices adapted to store the computer program product, or a combination of such memory devices.

The term "computer communication medium" refers herein to any physical interface adapted to transmit the computer program product from one place to another using for example, a modulated carrier wave, an optical signal, a DC or AC current, and the like means. By way of example, and not limitation, the computer communication medium may comprise twisted wire pairs, printed or flat cables, coaxial cables, fiber-optic cables, digital subscriber lines (DSL), or other wired, wireless, or optical serial or parallel interfaces, or a combination thereof.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A three-dimensional (3D) graphics pipeline comprising:
an interleaved multi-threading processor with a plurality of individual processing threads, the processor including:
a vertex processing stage comprising a first individual processing thread of the interleaved multi-threading processor and operable to output vertex information for a 3D graphics image;
a display sub-dividing stage operable to divide pixels in a display area, having the output vertex information superimposed, into sub-screens, the sub-screens forming a sub-screen task list; and
a pixel rendering stage comprising at least a second individual processing thread of the interleaved multi-threading processor different than the first individual processing thread and at least a third individual processing thread of the interleaved multi-threading processor different than the first individual processing thread and the second individual processing thread, wherein the pixel rendering stage is configured to execute, in parallel and independently, a first instruction set of a sub-screen task of the sub-screen task list using the second individual processing thread and a second instruction set of the sub-screen task of the sub-screen task list using the third individual processing thread.

2. The pipeline according to claim 1, wherein the first individual processing thread is the dedicated to the vertex processing stage, and wherein at least the second individual processing thread is dedicated to the pixel rendering stage.

3. The pipeline according to claim 1, wherein the display sub-dividing stage shares the first individual processing thread with the vertex processing stage.

4. The pipeline according to claim 3, wherein the display sub-dividing stage uses another one of the individual processing threads of the interleaved multi-threading processor.

5. The pipeline according to claim 1, wherein the pixel rendering stage is configured to perform rasterization, blending, texturing, and hidden surface removal operations to create a bit map of the 3D graphics image.

6. The pipeline according to claim 1, wherein the pipeline is associated with a display area of one of a personal digital assistant (PDA), a palm pilot, a mobile telephone, a cellular telephone, a satellite telephone, a laptop, a Notebook, and a Tablet PC.

7. The pipeline of claim 1, wherein the pipeline is further configured to:
profile the 3D graphics image; and
adjust operation of the display sub-dividing stage to divide pixels in the display area based on profiling the 3D graphics image.

8. The pipeline according to claim 7, wherein the pipeline is operable to adjust operation of the display sub-dividing stage by changing a number of the sub-screens into which pixels of the display area are divided.

9. The pipeline according to claim 1, wherein the pipeline is configured to profile the 3D graphics image, and adjust a number of the individual threads of the interleaved multi-threading processor used by the pixel rendering stage based on profiling the 3D graphics image.

10. The pipeline of claim 1, wherein the pixel rendering stage is configured to vary a number of individual processing threads of the interleaved multi-threading processor used to render pixels of multiple sub-screen tasks in the sub-screen task list in parallel and independently.

11. The pipeline of claim 1, wherein the first individual thread is dedicated to the vertex processing stage, wherein the second individual thread is dedicated to the pixel rendering stage, and wherein at least one other individual thread of the interleaved multi-threading processor is dedicated to the display sub-dividing stage.

12. A method comprising:
vertex processing, using a first individual processing thread of an interleaved multi-threading processor, vertex objects to output vertex information for a three-dimensional (3D) graphics image;
superimposing, using the first individual processing thread, the output vertex information on a display area;
dividing the display area into a plurality of sub-screens to create sub-screen tasks in a task list, the display area having pixels;
executing a first instruction set of a sub-screen task of the sub-screen task list using a second individual processing thread of the interleaved multi-threading processor different than the first individual processing thread; and
executing, in parallel to and independent from the first instruction set, a second instruction set of the sub-screen task of the sub-screen task list using a third individual processing thread of the interleaved multi-threading processor different than the first individual processing thread and the second individual processing thread.

13. The method according to claim 12, wherein the pixel rendering includes:
seizing and locking a respective one available sub-screen task in the task list by an individual processing thread of the interleaved multi-threading processor;
processing independently those pixels of the respective one sub-screen task when seized; and
repeating the seizing and locking step and the processing step by other individual processing threads of the interleaved multi-threading processor for each subsequently available sub-screen task.

14. The method according to claim 13, wherein the first individual processing thread of the interleaved multi-threading processor is dedicated to processing the vertex objects to create the vertex information.

15. The method according to claim 14, wherein the dividing the display area into a plurality of sub-screens includes sharing the first individual processing thread with vertex processing the vertex objects to output the vertex information.

16. The method according to claim 10, wherein the pixel rendering includes: rasterizing, blending and texturing those pixels of each sub-screen task until the task list is empty to create a bit map of the 3D graphics image.

17. The method according to claim 10, wherein the pixel rendering includes:
generating a bit map for display in the display area, the display area being associated with one of a personal digital assistant (PDA), a palm pilot, a mobile telephone, a cellular telephone, a satellite telephone, a laptop, a Notebook, and a Tablet PC.

18. The method of claim 10, further comprising:
profiling the 3D graphics image; and
adjusting dividing the display area into a plurality of sub-screens based on the profiling of the 3D graphics image.

19. The method of claim 16, wherein adjusting dividing of pixels of the display area into a plurality of sub-screens based on the profiling of the 3D graphics image includes adjusting a number of sub-screens into which pixels of the display area are divided.

20. The method of claim 10, further comprising:
profiling the 3D graphics image; and
adjusting a number of individual threads of the interleaved multi-threading processor used for pixel rendering based on profiling the 3D graphics image.

21. The method of claim 12, further comprising varying a number of individual processing threads of the interleaved multi-threading processor used to render pixels of multiple sub-screen tasks in the sub-screen task list in parallel and independently.

22. The method of claim 12, wherein vertex processing, using the first individual processing thread of an interleaved multi-threading processor comprises using the first individual thread dedicated to the vertex processing, wherein executing the first instruction set of a sub-screen task of the sub-screen task list comprises using the second individual processing thread dedicated to pixel rendering, and wherein superimposing and dividing comprises using at least one other individual processing thread of the interleaved multi-threading processor dedicated to the superimposing and dividing.

23. A computer program product including a non-transitory computer readable medium having instructions for causing a computer to:
vertex process, using a first individual processing thread of an interleaved multi-threading processor, to create output vertex information for a three-dimensional (3D) graphics image;
divide a display area, having the output vertex information superimposed, into sub-screens to create sub-screen tasks in a task list, the sub-screens tasks having pixels;
execute, using a second individual processing thread of the interleaved multi-threading processor, a first instruction set of a sub-screen task of the sub-screen task list; and
execute, in parallel to and independent from the first instruction set, a second instruction set of the sub-screen task of the sub-screen task list using a third individual processing thread of the interleaved multi-threading processor different than the first individual processing thread and the second individual processing thread.

24. The computer program product of claim 23, wherein the instructions to pixel render include instructions to:
seize and lock a respective one available sub-screen task in the task list by an individual processing thread of the interleaved multi-threading processor;
process independently those pixels of the respective one sub-screen task when seized by the processing thread; and
repeat the instructions operable to seize and lock and process by other individual processing threads of the interleaved multi-threading processor for each subsequently available sub-screen task.

25. The computer program product of claim 24, wherein the instructions to vertex process include instructions operable to:
vertex process using the first individual processing thread dedicated to the vertex processing.

26. The computer program product of claim 25, wherein the instructions to divide includes instructions to share the first individual processing thread with the instructions to vertex process.

27. The computer program product of claim 22, wherein the non-transitory computer readable medium comprises a shared processor readable medium of a wireless communication device.

28. The computer program product of claim 19, wherein the instructions to pixel render includes instructions to rasterize, blend and texture those pixels of each sub-screen task to create a bit map of the 3D graphics image.

29. The computer program product of claim 19, further comprising instructions for causing the computer to:
profile the 3D graphics image; and
adjust the instructions to cause the computer to divide the display area into a plurality of sub-screens based on the profile of the 3D graphics image.

30. The computer program product of claim 25, further comprising instructions for causing the computer to:
adjust a number of sub-screens that pixels of the display area are divided into.

31. The computer program product of claim 19, further comprising instructions for causing the computer to:
profile the 3D graphics image; and
adjust a number of individual threads of the interleaved multi-threading processor used to pixel render pixels of multiple sub-screen tasks based on profiling the 3D graphics image.

32. The computer program product of claim 23, wherein the instructions further include instructions to:
vary a number of individual processing threads of the interleaved multi-threading processor used to render pixels of multiple sub-screen tasks in the sub-screen task list in parallel and independently.

33. The computer program product of claim 23, wherein the instructions further include instructions to:
vertex process, using the first individual processing thread of the interleaved multi- threading processor dedicated to vertex processing; and
pixel render using the second individual processing thread of the interleaved multi-threading processor dedicated to pixel rendering, and superimpose and divide using at least one other individual processing thread of the interleaved multi-threading processor dedicated to superimposing and dividing.

34. A wireless device comprising:
a digital signal processor having a plurality of processing threads;
a shared memory accessed by the processing threads; and
processing means operable to perform pixel rendering without a dedicated graphics accelerator, wherein the processing means is configured to perform:
vertex processing, using a first individual processing thread of an interleaved multi-threading processor, vertex objects to output vertex information for a three-dimensional (3D) graphics image;
superimposing, using the first individual processing thread, the output vertex information on a display area;
dividing the display area into a plurality of sub-screens to create sub-screen tasks in a task list, the display area having pixels; and
executing, using a second individual processing thread of the interleaved multi-threading processor a first instruction set of a sub-screen task of the sub-screen task list; and
executing, in parallel to and independent from the first instruction set, a second instruction set of the sub-screen task of the sub-screen task list using a third individual processing thread of the interleaved multi-threading processor different than the first individual processing thread and the second individual processing thread.

35. The device according to claim 28, wherein the device includes one of a personal digital assistant (PDA), a palm pilot, a mobile telephone, a cellular telephone, a satellite telephone, a laptop, a Notebook, and a Tablet PC.

36. The device of claim 34, further comprising varying a number of individual processing threads of the interleaved multi-threading processor used to render pixels of multiple sub-screen tasks in the sub-screen task list in parallel and independently.

37. The device of claim 34, wherein vertex processing, using a first individual processing thread of an interleaved multi-threading processor comprises using the first individual thread dedicated to the vertex processing, wherein executing the first instruction set of a sub-screen task of the sub-screen task list comprises using the second individual processing thread dedicated to the pixel rendering, and wherein superimposing and dividing comprises using at least one other individual processing thread of the interleaved multi-threading processor dedicated to the superimposing and dividing.

38. A device comprising:
means for vertex processing vertex objects to output vertex information for a three dimensional (3D) graphics image using a first individual processing thread of an interleaved multi-threading processor;
means for superimposing the output vertex information on a display area;
means for dividing the display area into a plurality of sub-screens to create sub-screen tasks in a task list, the display area having pixels;
means for executing, using a second individual processing thread of the interleaved multi-threading processor a first instruction set of a sub-screen task of the sub-screen task list; and
means for executing, in parallel to and independent from the first instruction set, a second instruction set of the sub-screen task of the sub-screen task list using a third individual processing thread of the interleaved multi-threading processor different than the first individual processing thread and the second individual processing thread.

39. The device of claim 38, wherein the means for pixel rendering further comprises:
  means for seizing and locking a respective one available sub-screen task in the task list by an individual processing thread of the interleaved multi-threading processor;
  means for processing independently those pixels of the respective one sub-screen task when seized; and
  means for repeating the seizing and locking step and the processing step by other individual-processing threads of the interleaved multi-threading processor for each subsequently available sub-screen task.

40. The device of claim 39, wherein the first individual processing thread is dedicated to the means for vertex processing vertex objects to output vertex information.

41. The device of claim 40, wherein the means for dividing the display area into a plurality of sub-screens includes means for sharing the first individual processing thread with the means for vertex processing vertex objects to output vertex information.

42. The device of claim 38, wherein the means for pixel rendering includes: means for rasterizing, blending and texturing those pixels of each sub-screen task until the task list is empty to create a bit map of the 3D graphics image.

43. The device of claim 38, wherein the means for pixel rendering includes:
  means for generating a bit map for display in the display area, the display area being associated with one of a personal digital assistant (PDA), a palm pilot, a mobile telephone, a cellular telephone, a satellite telephone, a laptop, a Notebook, and a Tablet PC.

44. The device of claim 38, further comprising:
  means for profiling the 3D graphics image; and
  means for adjusting dividing the display area into a plurality of sub-screens based on the profiling of the 3D graphics image.

45. The device of claim 44, wherein the means for adjusting dividing of pixels of the display area into a plurality of sub-screens based on the profiling of the 3D graphics image includes means for adjusting a number of sub-screens into which pixels of the display area are divided.

46. The device of claim 38, further comprising:
  means for profiling the 3D graphics image; and
  means for adjusting a number of individual threads of the interleaved multi-threading processor used for pixel rendering based on profiling the 3D graphics image.

47. The device of claim 38, further comprising means for varying a number of individual processing threads of the interleaved multi-threading processor used to render pixels of multiple sub-screen tasks in the sub-screen task list in parallel and independently.

48. The device of claim 38, wherein the means for vertex processing use the first individual thread dedicated to vertex processing, wherein the means for executing the first instruction set, use the second individual processing thread dedicated to pixel rendering, and wherein the means for dividing use at least one other individual processing thread of the interleaved multi-threading processor dedicated to superimposing and dividing.

* * * * *